(12) United States Patent
Dobrowolski

(10) Patent No.: US 10,167,966 B2
(45) Date of Patent: Jan. 1, 2019

(54) VENTILATING VALVE FOR A SEWER PIPE

(71) Applicant: Capricorn S.A., Swiebodzice (PL)

(72) Inventor: Maciej Dobrowolski, Grodziszcze (PL)

(73) Assignee: Capricorn S.A., Swiebodzice (PL)

( * ) Notice: Subject to any disclaimer, the term of this patent is extended or adjusted under 35 U.S.C. 154(b) by 0 days.

(21) Appl. No.: 15/079,448

(22) Filed: Mar. 24, 2016

(65) Prior Publication Data

US 2016/0290518 A1 Oct. 6, 2016

(30) Foreign Application Priority Data

Apr. 2, 2015 (DE) .................. 10 2015 004 532

(51) Int. Cl.
*F16K 15/14* (2006.01)
*F16K 17/02* (2006.01)
*E03C 1/122* (2006.01)

(52) U.S. Cl.
CPC .......... *F16K 15/141* (2013.01); *E03C 1/1225* (2013.01); *F16K 17/02* (2013.01)

(58) Field of Classification Search
CPC ....... F16K 15/141; F16K 17/02; E03C 1/1225
USPC ................................. 137/526, 533
See application file for complete search history.

(56) References Cited

U.S. PATENT DOCUMENTS

| | | | | |
|---|---|---|---|---|
| 2,872,938 A | * | 2/1959 | Hansen | F16K 17/19 137/493.9 |
| 4,232,706 A | * | 11/1980 | Ericson | E03C 1/12 137/216.2 |
| 5,048,562 A | * | 9/1991 | Frawley | E03C 1/122 137/516.15 |
| 5,441,679 A | * | 8/1995 | Chalich | B29C 45/1676 264/250 |
| 5,836,345 A | * | 11/1998 | Ericson | E03C 1/122 137/382 |
| 6,234,198 B1 | * | 5/2001 | Chalich | F16K 24/06 137/526 |
| 2010/0032028 A1 | * | 2/2010 | Trueb | E03C 1/12 137/526 |
| 2010/0139788 A1 | * | 6/2010 | Lackey | E03C 1/122 137/526 |

FOREIGN PATENT DOCUMENTS

DE 202014006323 U1 9/2014
PL 67455 Y1 10/2014

OTHER PUBLICATIONS

German Office Action dated Jan. 14, 2016, in German Application No. 10 2015 004 532.6.

* cited by examiner

*Primary Examiner* — P. Macade Nichols
(74) *Attorney, Agent, or Firm* — Stephan A. Pendorf; Patent Central LLC

(57) ABSTRACT

A reliable low-wear ventilating valve for mounting on a sewer pipe, to prevent the development of a negative pressure and also to prevent the escaping of unpleasant odors. The ventilating valve includes a tubular body, one end of which is configured as a fastening piece for mounting on a sewer pipe and the other end of which is configured as a ventilating valve head which has inlet openings for the inlet air into the sewer pipe, which are located between concentric rings which are arranged at a distance from the tubular body and extending symmetrically about the latter on ribs of the tubular body.

10 Claims, 4 Drawing Sheets

VENTILATING VALVE FOR A SEWER PIPE

The invention relates to a ventilating valve for mounting on a sewer pipe, to prevent the development of a negative pressure and the escaping of unpleasant odors.

Such a ventilating valve is known from the Polish utility model PL 67455 Y1. This ventilating valve consists of a tube-like body, in which one end is configured as a fastening piece for mounting on a sewer pipe and the other end is configured as a ventilating valve head, which has inlet openings for the inlet air into the sewer pipe. The inlet openings are located between concentric rings which form a lower portion of the ventilating valve head and are arranged at a distance from the tubular body and extending symmetrically about the latter on ribs of the tubular body.

An annular membrane is placed on the upper concentric ring, the ribs and the end of the tubular body, which seals and opens the inlet openings, wherein the membrane is guided on the inner ring by means of guide pins arranged on a lid of the ventilating valve head.

The lid of the ventilating valve head is connected in a sealing manner externally with the upper concentric ring and is a distance from the end of the tubular body internally.

If the pressure in the sewer pipe is similar to the atmospheric pressure, the membrane seals the inflow openings.

If the pressure in the sewer pipe assumes a value below the atmospheric pressure, the annular membrane is raised by the atmospheric pressure and outside air flows into the sewer pipe. If the pressure in the sewer pipe is greater than the atmospheric pressure, the gasket is pressed onto the upper concentric ring, the ribs and the end of the tubular body by the pressure in the sewer pipe. The inflow openings are sealed.

It is the object of the invention to improve such a ventilating valve to the extent that it operates more reliably and more freely of wear.

This object is achieved with the features of Claim 1. Advantageous configurations form the subject matter of the subordinate claims.

The ventilating valve according to the invention comprises a tubular body, one end of which is configured as a fastening piece for mounting on a sewer pipe and the other end of which is configured as a ventilating valve head, wherein the ventilating valve head has inlet openings for the inlet air into the sewer pipe, which are located between concentric rings which are arranged at a distance from the tubular body and extending symmetrically about the latter on ribs of the tubular body.

The upper concentric ring at the top and the tubular body at its end each have a circumferential fixed support ring for an annular membrane which is movable in a guided manner for opening and sealing the inlet openings, wherein the annular membrane is level on the support side and tapers on the side pointing into the ventilating valve head, in each case, from the edges towards the center of the ring. The ventilating valve head is sealed by a lid which is arranged in a sealing manner on the upper concentric ring and is a distance from the membrane internally in the ventilating valve head.

In a preferred embodiment, a sieve which fills up the cross section of the tubular body is arranged in the end region of the tubular body in the ventilating valve head, which sieve comprises guide pins for the inside of the annular membrane.

The guide pins are preferably dimensioned such that they contact the inside of the arranged lid.

The annular membrane is tapered in each case linearly from the edges of the membrane and preferably symmetrically to the center of the ring.

The outer edges of the annular membrane are executed in a rounded manner on the side having the tapering.

In addition, it has been shown that the reliability of the ventilating valve can be improved in particular in the case of extreme temperature differences, if the lid comprises a layer of insulation or an insulating protective cover. The membrane is protected at the same time by this. In a preferred embodiment, a part of the shipping packaging is used for this.

The invention will be explained with reference to the figures, wherein

Figure 1:
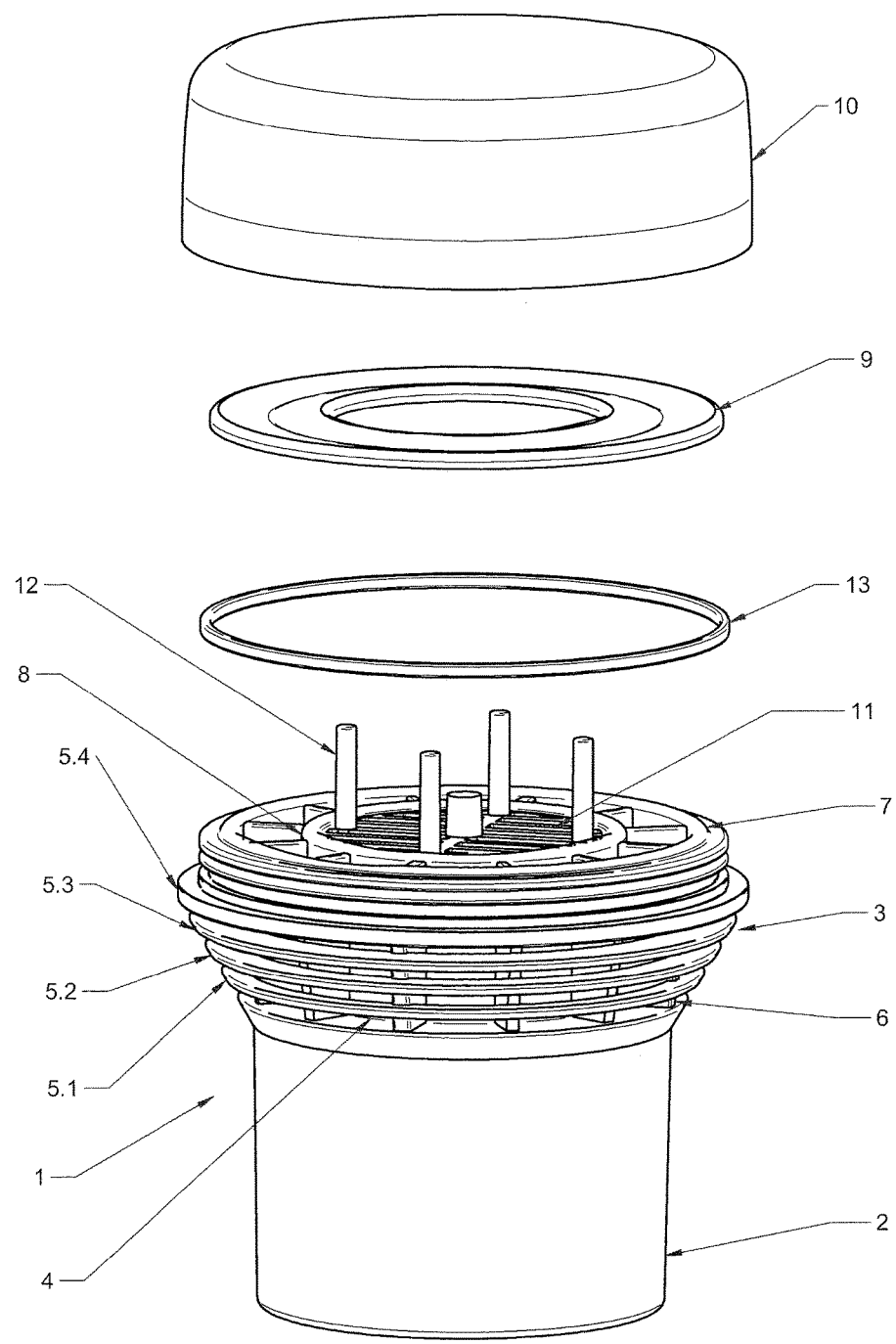
FIG. 1 shows the ventilating valve in an exposé drawing.
Figure 2:
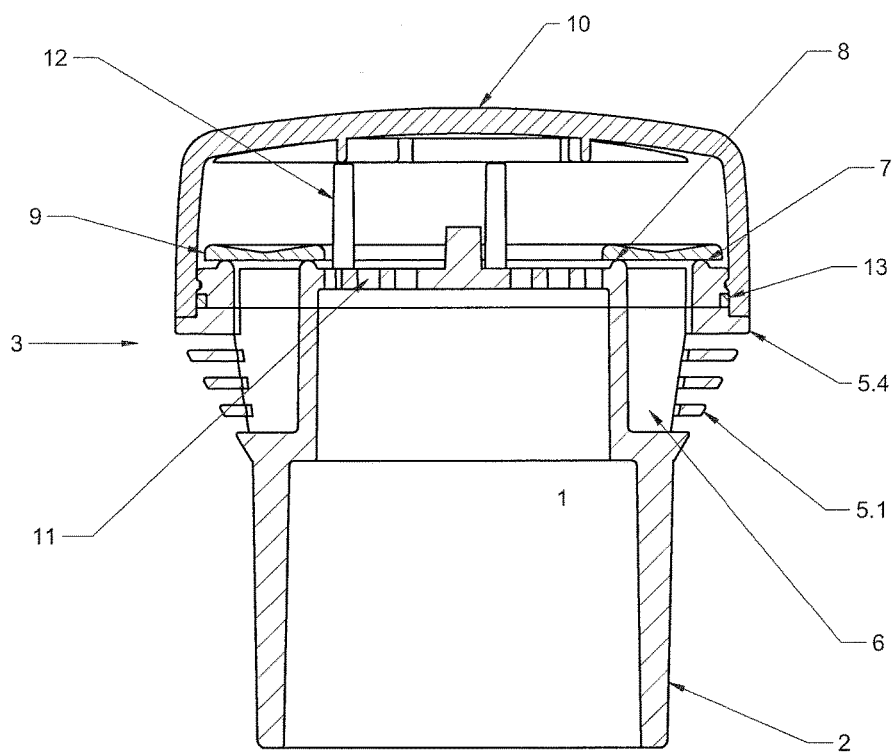
FIG. 2 shows a cross-sectional view of the ventilating valve.

FIG. 1 and FIG. 2 show that the ventilating valve consists of a tubular body 1, one end of which is configured as a fastening piece 2 for mounting on a sewer pipe and the other end of which is configured as a ventilating valve head 3. The ventilating valve head 3 is closed at the top in a sealing manner by a lid 10. The gasket 13 serves to seal it. The ventilating valve head 3 has inlet openings 4 between concentric rings 5.1-5.4, which are arranged at a distance from the tubular body 1 and extending symmetrically about the latter on ribs 6 of the tubular body 1. Both the tubular body 1 and the upper concentric ring 5.4 comprise at the top, i.e. pointing in the direction of the lid 10, a support ring 7 or 8 for an annular membrane 9 which is movable in a guided manner, by means of which opening and sealing of the inlet openings 4 can be achieved. The support rings are a fixed part of the upper concentric ring 5.4 and/or of the tubular body 1.

The membrane 9 is opened and closed, as already described in the prior art, in the following way.

If the pressure in the sewer pipe is equal to the atmospheric pressure, the membrane 9 seals the inflow openings 4, in that the membrane 9 rests on the support rings 7 and 8.

If the pressure in the sewer pipe assumes a value below the atmospheric pressure, the annular membrane 9 is raised by the atmospheric pressure and outside air can flow into the sewer pipe. If the pressure in the sewer pipe is greater than the atmospheric pressure, the membrane 9 is pressed by means of the pressure in the sewer pipe onto the support rings 7 and 8 and seals the inflow openings 4.

In the case of the movement of the membrane 9, the latter is guided in a preferred embodiment by guide pins 12 for the inside of the annular membrane 9. The guide pins 12 are arranged on a sieve 11 which fills up the tubular body 1 in cross section, and prevents animals penetrating the ventilating valve head 3.

The advantage of the arrangement of the guide pins 12 on the sieve 11, compared with the prior art, is that it is not possible to clamp the membrane 9 during assembly in those locations where guide pins are arranged on the lid 10 and the membrane 9 constantly moves along on smooth portions of the guide pins 12 on opening and closing of the inlet openings 4.

The length of the guide pins 12 is preferably dimensioned such that they contact the inside of the mounted lid 10.

Figure 3:
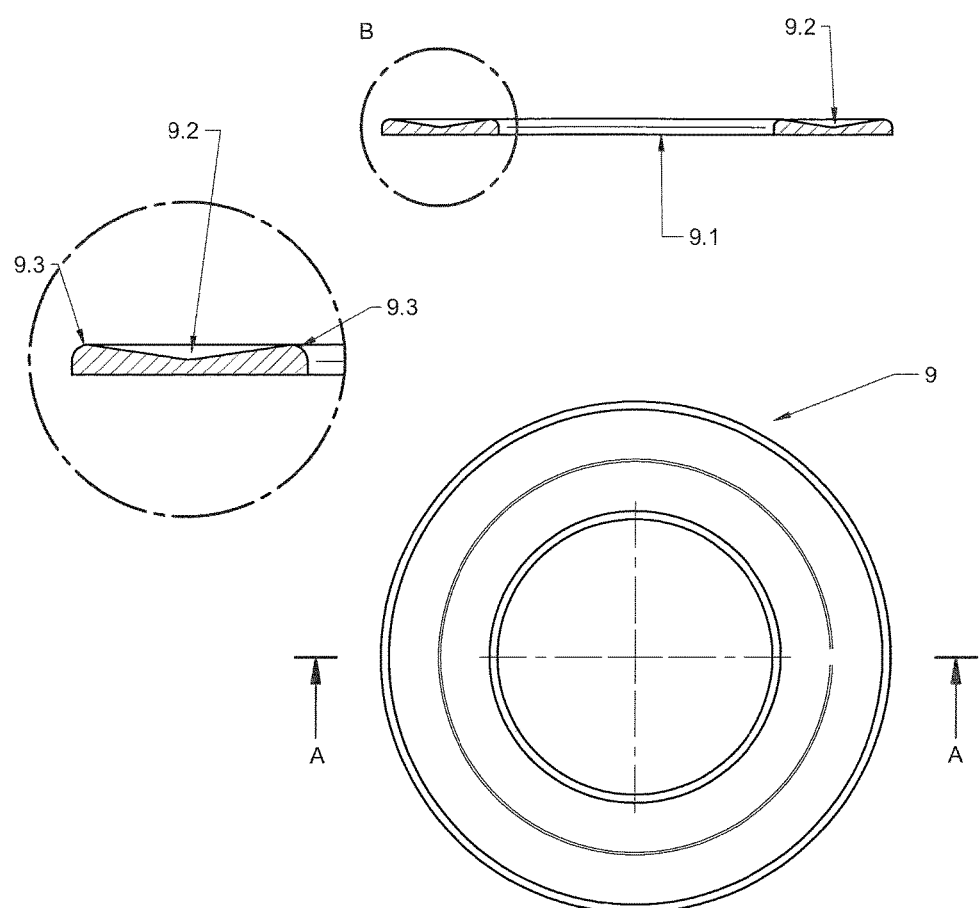
FIG. 3 shows the membrane in three views.

The annular membrane 9, the cross section of which is shown in FIG. 3, is configured to be level on the support side 9.1 and configured to be tapering from the edge sides, in each case, on the side pointing into the fastening valve head 3. This tapering 9.2 is effected linearly and symmetrically with respect to the center of the ring.

In addition, it is shown that the outer edges of the membrane 9 comprise an edge rounding 9.3 on the side having the tapering 9.2.

Figure 4:
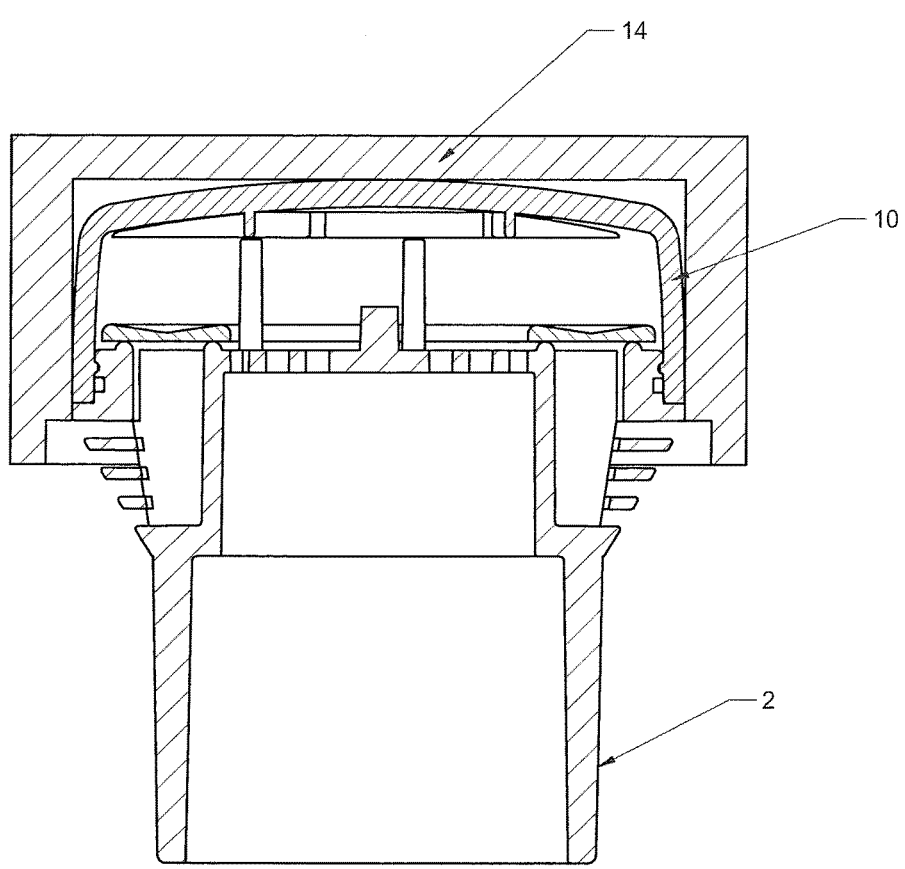
FIG. 4 shows the ventilating valve with the insulating cover.

FIG. 4 shows the ventilating valve having an insulating cover 14 for the lid 10 made of a foamed thermoplastic. In a preferred embodiment a part of the shipping packaging made of polystyrene can be used for this, since this is adapted to the lid form internally.

Compared with the prior art, the ventilating valve thus configured has a higher reliability and lower wear.

LIST OF REFERENCE NUMERALS

1 Tubular body
2 Fastening piece
3 Ventilating valve head
4 Inlet openings
5.1-5.4 Concentric rings
6 Ribs
7 Support ring
8 Support ring
9 Annular membrane
9.1 Support side
9.2 Tapering
9.3 Edge rounding
10 Lid
11 Sieve
12 Guide pins
13 Seal for the lid
14 Insulating protective cover

The invention claimed is:

1. A ventilating valve comprising
a tubular body (1) having an inside, a bottom end and a top end, the bottom end configured as a fastening piece (2) for mounting on a sewer pipe and the top end configured as a ventilating valve head (3), wherein the ventilating valve head comprises:
ribs (6) extending upwards from the fastening piece (2),
concentric rings (5.1-5.4) arranged spaced apart and one above the other on the ribs (6), wherein inlet openings (4) for the inlet of air into the sewer pipe are defined between the ribs (6) and the concentric rings (5.1-5.4), the concentric rings including an upper concentric ring (5.4),
an essentially flat disk-shaped annular membrane (9) having a radially inner edge, a radially outer edge, a bottom side (9.1) and a top side (9.2),
a radially inner circumferential valve seat ring (7) for the annular membrane (9),
a radially outer circumferential valve seat ring (8) for the annular membrane (9), wherein said radially inner and radially outer circumferential valve seat rings (7, 8) define between them a vent opening through which the tubular body inside communicates with the ambient environment, wherein the annular membrane (9) is flat on the bottom side (9.1) and tapers on the top side, in each case, from the edges towards the center of the ring,
a lid (10) arranged in a sealing manner on the upper concentric ring (5.4),
a sieve (11) connected to the radially inner circumferential valve seat ring (8) and
guide pins (12) connected to said sieve (11) and projecting above the radially inner circumferential valve seat ring (7), wherein said ventilating valve head is configured such that:
(a) when a pressure in the inside of the tubular body is equal to atmospheric pressure, the disk-shaped annular membrane (9) rests on the radially inner and radially outer circumferential valve seat rings (7, 8) sealing the vent opening defined between the radially inner and radially outer circumferential valve seat rings (7, 8), and
(b) when a pressure in the inside of the tubular body is below atmospheric pressure, the disk-shaped annular membrane (9) is raised by the atmospheric pressure, the radially inner edge of the disk-shaped annular membrane (9) guided by contact with said guide pins (12), to allow communication between the outside atmosphere and the inside of the tubular body (1).

2. The ventilating valve according to claim 1, wherein the sieve (11) fills up a cross section of the tubular body (1) in the ventilating valve head (3).

3. The ventilating valve according to claim 2, wherein the guide pins (12) are dimensioned such that they contact the lid (10).

4. The ventilating valve according to any claim 1, wherein the tapering (9.2) of the annular membrane (9) is effected linearly in each case.

5. The ventilating valve according to claim 1, wherein the tapering (9.2) of the annular membrane (9) is effected symmetrically to the center of the ring.

6. The ventilating valve according to claim 1, wherein the radially inner and radially outer edges of the annular membrane (9) are rounded.

7. The ventilating valve according to claim 1, wherein the lid (10) is provided externally with an insulating protective cover (14) made of a foamed thermoplastic.

8. The ventilating valve according to claim 7, wherein the protective cover (14) is part of the shipping packaging for the ventilating valve.

9. The ventilating valve according to claim 1, wherein the lid (10) is provided externally with an insulating protective cover (14) made of polystyrene.

10. A ventilating valve comprising
a tubular body (1) having an inside, a bottom end and a top end, the bottom end configured as a fastening piece (2) for mounting on a sewer pipe and the top end configured as a ventilating valve head (3), wherein the ventilating valve head comprises:
ribs (6) extending upwards from the fastening piece (2),
concentric rings (5.1-5.4) arranged spaced apart and one above the other on the ribs (6), wherein inlet openings (4) for the inlet of air into the sewer pipe are defined between the ribs (6) and the concentric rings (5.1-5.4), the concentric rings including an upper concentric ring (5.4),
a disk-shaped annular membrane (9) having a radially inner edge, a radially outer edge, a bottom side (9.1) and a top side (9.2),
a radially inner circumferential valve seat ring (7) for the annular membrane (9),
a radially outer circumferential valve seat ring (8) for the annular membrane (9), wherein said radially inner and radially outer circumferential valve seat rings (7, 8) define between them a vent opening through which the tubular body inside communicates with the ambient environment, wherein the annular membrane (9) is flat on the bottom side (9.1) and tapers on the top side, in each case, from the edges towards the center of the ring, a lid (10) arranged in a sealing manner wherein the guide pins are dimensioned such that they contact an inside of the lid on the upper concentric ring (5.4), a sieve (11) connected to the radially inner circumferential valve seat ring (8) and guide pins (12) connected to said sieve (11) and projecting above the radially inner circumferential valve seat ring (7), wherein said ventilating valve head is configured such that:

(a) when a pressure in the inside of the tubular body is equal to atmospheric pressure, the disk-shaped annular membrane (9) rests on the radially inner and radially outer circumferential valve seat rings (7, 8) sealing the vent opening defined between the radially inner and radially outer circumferential valve seat rings (7, 8), and (b) when a pressure in the inside of the tubular body is below atmospheric pressure, the disk-shaped annular membrane (9) is raised by the atmospheric pressure, the radially inner edge of the disk-shaped annular membrane (9) guided by contact with said guide pins (12), to allow communication between the outside atmosphere and the inside of the tubular body (1).

\* \* \* \* \*